United States Patent [19]

Cohen

[11] Patent Number: 4,527,267
[45] Date of Patent: Jul. 2, 1985

[54] METHOD OF ADMINISTERING LOCAL AND END-TO-END ACKNOWLEDGMENTS IN A PACKET COMMUNICATION SYSTEM

[75] Inventor: Karen L. Cohen, Brooklyn, N.Y.

[73] Assignee: AT&T Bell Laboratories, Murray Hill, N.J.

[21] Appl. No.: 396,677

[22] Filed: Jul. 9, 1982

[51] Int. Cl.³ .................. H04Q 11/04; H04J 3/00; H04J 6/00
[52] U.S. Cl. ............................ 370/60; 370/94
[58] Field of Search ............ 370/60, 94, 58, 91, 370/110.1; 340/825.54

[56] References Cited

U.S. PATENT DOCUMENTS

| Re. 31,182 | 3/1983 | Crager et al. | 370/94 |
| 4,074,232 | 2/1978 | Otomo et al. | 370/60 |
| 4,354,263 | 10/1982 | Bordry et al. | 370/60 |
| 4,399,531 | 8/1983 | Grande et al. | 370/94 |

FOREIGN PATENT DOCUMENTS 142903 11/1979 Japan .................. 370/94

OTHER PUBLICATIONS

E. Faldella, "A Microprocessor-Controlled Packet Transmission System", Euromicro Jrnl., No. 6, Nov. 1980, pp. 417–427.
L. Pouzin, "Methods, Tools, and Observations on Flow Control in Packet-Switched Data Networks", IEEE Trans. on Comm., vol. COM-29, No. 4, Apr. 1981, pp. 413–426.
N. Corsi et al., "Design and Performance of Subscriber Access Equipment for Packet Switched Networks", CSELT Tech. Rep., vol. IX, No. 5, Oct. 1981, pp. 509–517.
S. Joshi et al., "Protocols and Network-Control Chips: A Symbiotic Relationship", Electronics, Jan. 12, 1984, pp. 157–163.

Primary Examiner—Douglas W. Olms
Assistant Examiner—Wellington Chin
Attorney, Agent, or Firm—Frederick W. Padden

[57] ABSTRACT

A D-bit in an X.25 data packet access protocol flags whether an acknowledgment of packet communication can be local or must be end-to-end. The disclosed method with programmed processing handles the D-bit option by a two-sided memory table that couples the X.25 access protocol and the internal protocol of a packet switching network. The table, called rack_perm (for Receive ACKnowledgment PERMission) is set with one entry per data packet sequence number. The rack_perm entries are modified by the internal protocol in response to an acknowledgment packet received from the switching network. Checks are made of rack_perm by the internal protocol using indices of the access protocol to determine the number of acknowledgment packets permitted to be sent to an originating data terminal equipment.

29 Claims, 5 Drawing Figures

METHOD OF ADMINISTERING LOCAL AND END-TO-END ACKNOWLEDGMENTS IN A PACKET COMMUNICATION SYSTEM

TECHNICAL FIELD

This invention relates to information flow control in packet communication systems and particularly to protocol arrangements for local and end-to-end acknowledging and the internal control of the flow and delivery of information through a packet switching system.

BACKGROUND OF THE INVENTION

Packet switching has been defined as the transmission of data between terminal equipments by means of addressed packets, whereby a transmission channel is occupied for the duration of transmission of the packet only. The channel is then available for use by packets being transferred between different terminal equipments.

A packet switch functions by accepting a message from an originating terminal or computer, inserting various kinds of network control information for error control, flow control, sequencing and the like; and then routing the packet through a path containing one or more packet switching nodes until it arrives at the destination node. The packets of the message are then checked for correctness and transmitted to the destination terminal or computer. Under certain protocols and at originating customer request, an end-to-end acknowledgment of packet transmissions is generated and transmitted back to the originating terminal or computer.

Packet switches and networks are currently available to offer a variety of interfaces to many different types of terminal equipments and computers. They provide a grade of service for customers by means of a set of communication protocols between adjacent switches and networks and from source to destination. The protocols insure that packets are delivered correctly or, in some cases when they cannot be delivered due to a failure, that the source is notified of that event. In addition, the protocols perform flow control so that the source is regulated to send no more traffic than the destination or packet switch can accept.

An international standard protocol for interfacing data terminals and computers to any packet switching network has been recommended by the Study Group VII of the CCITT (Consultative Committee of International Telegraph and Telephone). The protocol known as Recommendation X.25 provides rules on how to establish an access link to the packet switch network, set-up virtual circuits, and transfer data.

Recommendation X.25 entitled "Interface Between Data Terminal Equipment (DTE) and Data Circuit Terminating Equipment (DCE) For Terminals Operating In The Packet Mode On Public Networks" Yellow Book, Volume VIII—Fascicle VIII.2, page 100 et seq., dated 1981 for the VII Plenary Assembly Geneva, Nov. 10-21, 1980, has gained worldwide acceptance for use as a standard interface both to connect user data terminals and computers to domestic networks so that information communication may flow freely without any complications for the network customers.

In essence, X.25 provides precise procedures for a data terminal or computer first to obtain access to a packet switching network and then to establish one or more so-called virtual circuits and/or permanent virtual circuits each on a distinct logical channel through the network to a destination data terminal or computer. The protocol utilizes a D (Delivery Confirmation or Acknowledgment) bit in the packet information to indicate the type of acknowledgment desired for the data it is transmitting.

The D-bit in an X.25 data packet flags whether the acknowledgment (ACK) to the packet can be local or must be end-to-end. The ACK is given in one of three forms: in an RR (Receiver Ready) packet; in an RNR (Receiver Not Ready) packet, or piggybacked onto a data packet. If the value of the D-bit is 0 then the ACK may be local to the interface with the network. If the D-bit value is 1, then the ACK must be end-to-end. The latter ACK means that the packet's destination (the customer) must specifically send an ACK to the network before it can ACK back to the packet's source. This arrangement is complicated by the fact that, besides the D-bit option, the transport switching network implements its own congestion management. Resultingly, the network is required to track which packets may be acknowledged when permitted to do so by the congestion mechanism and the D-bit option.

The access protocol controls, on a per logical channel basis, "windows" to authorize data packets out to/from the customer, while the internal protocol on the same logical channel of the transport network controls "windows" of authorized data packets between switches of the transport network. There is one window for each direction of transmission for each protocol. The two protocols control their respective windows somewhat independent of each other. For example, suppose on one such logical channel the access window size is 2 and the internal window size is 4. Now suppose that the customer transmits a data packet: Data 0 with D-bit=0 (local ACK). The access window is dropped to 1, the internal window is dropped to 3, but because no end-to-end ACK is designated, the access protocol sends an ACK back immediately, and the window again becomes 2. However, the internal protocol window remains at 3.

Continuing, suppose the customer sends in two more data packets: Data 1 with D-bit=1 (end-to-end ACK) and Data 2 with D-bit=0 (local ACK). The access window is now closed (set to 0) as neither Data 1 nor Data 2 can be acknowledged before the ACK for Data 1 is received from the destination. In the meantime, the internal protocol of the transport network is transmitting all three packets to the destination and it has not received any ACKs at all so its window is 1. When the ACK comes in from the network for the Data 0 packet, the access protocol cannot ACK anything new as Data 1 packet has still not been ACKed. The internal window goes to 2. However, when the ACK for the Data 1 packet is received by the internal protocol, the access protocol is allowed to not only ACK the Data 1 packet to the originating customer, but also the Data 2 packet as its D-bit was zero. Thus, if both packets are now ACKed, the access window returns to 2, but the internal protocol window is at 3 (one Data packet (Data 2) outstanding).

A problem confronting the art has been the coordination of the D-bit activity and windows of the access protocol of the data terminal equipment and the internal protocol of the transport switching network.

SUMMARY OF THE INVENTION

The foregoing problem is solved in an illustrative embodiment of the present invention in which the D-bit option is served by a two-sided memory table and a program controlled process that couples together the data terminal equipment access protocol and the internal protocol of the information transport switching network. The table illustratively called rack_perm (for Receive ACK PERMission), has one entry (a bit, byte or word) per data packet sequence number. In X.25, the latter is either modulus 8 or 128. In the transport switching network, the access sequence numbering is illustratively modulus 8, thus there are eight entries (numbered 0 through 7) in rack_perm per logical channel. It is noted that rack_perm only keeps track of received packets, that is, the coordination is done at the packet source only. The value of each entry is illustratively the value of the D-bit for the specific received packet.

Constants are defined so that a 0 means that ACK permission is granted, and a 1 means that ACK permission is denied. Rack_perm is two-sided as the indices from both the access protocol and the internal protocol are used to index the table. These indices are the ones utilized to control the respective access and internal protocol windows.

The rack_perm memory array keeps track of D-bit acknowledgment permissions for data packets received at the interface between the access protocol and the data terminal equipment. Its entries determine if a data packet with a known specific sequence number may be acknowledged in respect to D-bit processing. Rack_perm is indexed by sequence number to write and read acknowledgment permission values. Illustratively, a "0" D-bit is permission to ACK and a "1" is no permission to ACK.

Rack_perm stores acknowledgment permission information for data packets including D-bits received from originating terminal equipment and acknowledgment packets received from a destination end-point via the transport switching network. Thus, all the acknowledging information is kept in one place in the two-sided rack_perm memory table.

The illustrative processing steps involved, on a per logical channel basis, in receiving data packets with D-bits and acknowledgment packets, writing and reading acknowledgment permission information into and from rack_perm, and effecting local and end-to-end acknowledgment administration procedures occurs as follows: When a data packet with its D-bit value is received from an originating data terminal, an access protocol index corresponding illustratively to a send sequence number in the received packet is used to set in rack_perm a value corresponding to the received D-bit. The received packet is then transferred to the internal protocol for communication to the destination data terminal via the data transport switching network. Next, the internal protocol immediately checks the rack_perm for any permission to ACK the originating data terminal. In doing so, the internal protocol checks the rack_perm array using the access protocol indices to determine the number of packets that may be ACKed. The check is made by an iteration which involves specific accessing into rack_perm to count the consecutive number of ACK permissions authorized. The count is transferred to the access protocol which if the count illustratively is a zero, allows no ACK to be returned to the originating terminal. In contrast, if the count is greater than zero, an ACK of that count is allowed to the originating terminal. Accordingly, an ACKing packet is formatted by the access protocol with an appropriate PR (Receive sequence number) and is sent to the originating terminal. A single ACKing packet is formattable to ACK none to a window's worth of packets by virtue of its contents.

After the destination terminal has received a data packet requiring end-to-end acknowledgment, that terminal in its processing operations causes an acknowledgment packet to be communicated via the transport switching network to the internal protocol at the origination end. The latter, in turn, updates the rack_perm utilizing the internal protocol index illustratively corresponding to a receive sequence number in the received packet. The internal protocol again performs its iteration and counting steps using the access protocol indices to determine the number of packets that may be ACKed. Illustratively, no ACK is allowed when the iteration and count result is zero. When the result is greater than zero, an ACK is allowed and, accordingly, an acknowledgment packet with an appropriate receive sequence number is formatted by the internal protocol and sent via the access protocol to the originating terminal.

A feature of another preferred embodiment of this invention is a method in which the setting of the rack_perm memory is controlled by the internal protocol instead of the access protocol. The setting occurs after the access protocol receives a data packet, increments the access protocol receive sequence number, and transfers that packet to the internal protocol. The setting is controlled using a send sequence number of the received packet as an index to a storage location in the rack_perm and the D-bit as the value written into that location. In this manner, only one protocol controls and manipulates the rack_perm. Actual checking of the information stored in the rack_perm is executed by the internal protocol using the access protocol control parameters including its lower window edge and receive sequence number to determine the number of allowed local and end-to-end ACKs.

DETAILED DESCRIPTION

Figure 1:
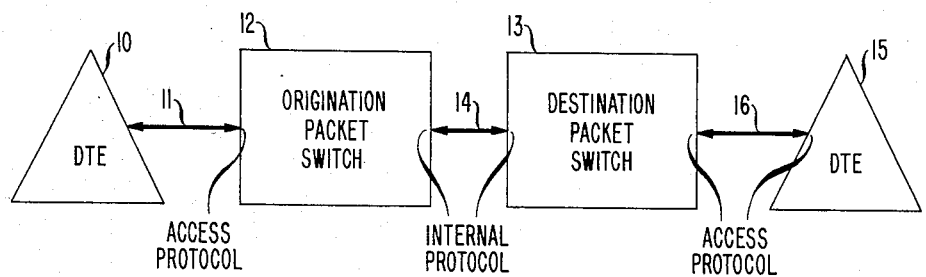
FIG. 1 is a block diagram depicting a pair of data terminal equipments interconnected by a packet switch transport network.

FIG. 1 illustrates an exemplary environment for implementing the D-bit feature in a packet switching system. It comprises data terminal equipment 10 connected over an access transmission line 11 to an origination packet switch 12. A destination packet switch 13 is interconnected with packet switch 12 over an internal transmission link 14. Another data terminal equipment 15 is connected via an access transmission line 16 to packet switch 13.

Two protocols are important to the illustrative embodiment, namely, an access protocol for data terminal equipment (DTE) entering the packet switch network, and an internal protocol administered within and between the packet switches. Illustratively, an access protocol is administered for packet communication over transmission line 11 for terminal equipment 10. An internal protocol is administered between packet switches 12 and 13 via link 14.

Illustratively, a two-sided table and algorithm for implementing the D-bit Receive ACKnowledgment PERMission is incorporated in the facilities of packet switch 12 for serving a logical channel from terminal equipment 10 to equipment 15.

Figure 2:
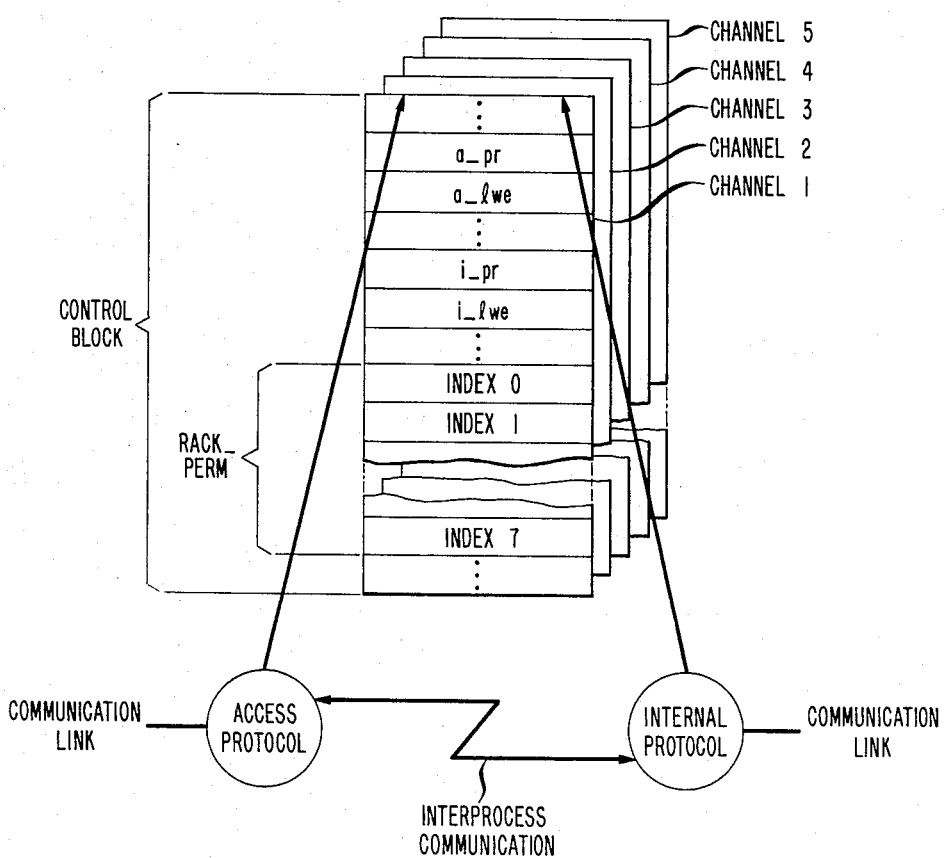
FIG. 2 illustrates a plurality of control block indices and rack_perm tables for a plurality of logical channels.

FIG. 2 discloses an illustrative arrangement of a set of five control blocks for five logical channels supporting either permanent virtual circuits or virtual calls. Each control block stores control parameters and rack_perm. By way of example, two control parameters a_pr and a_lwe are associated with an access protocol and two control parameters i_pr and i_lwe are associated with an internal protocol. The two protocols control the setting and resetting of the rack_perm and the establishment and use of the control parameters. The protocols communicate with one another via an interprocess communication link for packet handoff and other functions. Each protocol is connected to an individual link extending to a DTE or a packet switch (not shown).

To simplify the understanding of the illustrative embodiment, the following assumptions are made on the algorithm for implementing the D-bit using the two-sided table:

(1) All packets are error free in respect to format and values.

(2) No fragmentation of packets is done within the network of packet switches.

(3) The exemplary algorithm is presented from the origination view only for one virtual call from terminal equipment 10 to equipment 15. The manner in which the destination side of the system sends ACKing packets to the origination internal protocol is independent of the illustrative embodiment. There are illustratively two ways of doing so: A first way is for the origination internal protocol to receive ACKing only when the destination terminal equipment 15 sends one into the network. The second way is for the origination internal protocol to receive ACKing from the destination internal protocol without the latter waiting for an RR/RNR from the destination terminal equipment 15. In such a case, the destination internal protocol needs to implement a sack_perm (Send ACKnowledgment PERMission) array (not shown) similar in design to the rack_perm of the present invention. Sack_perm is equipped to hold the status of data packets sent to the destination terminal equipment 15 and to enable the destination internal protocol at the appropriate time to send RR/RNRs to the origination internal protocol.

(4) The algorithm does not discuss all three ways of ACKing. RRs are used as exemplary acknowledgment packets.

(5) The algorithm does not take into account a difference in window sizes between the access and internal protocols. In fact, window sizes of the two protocols may be different to allow for speed matching. The algorithm only determines if, because of the D-bit, an ACK is allowed. Another check on top of the D-bit check is needed to ensure that the internal protocol window is not violated when the internal and access windows are different. The illustrative algorithm assumes that the extra check always passes.

Figure 3:
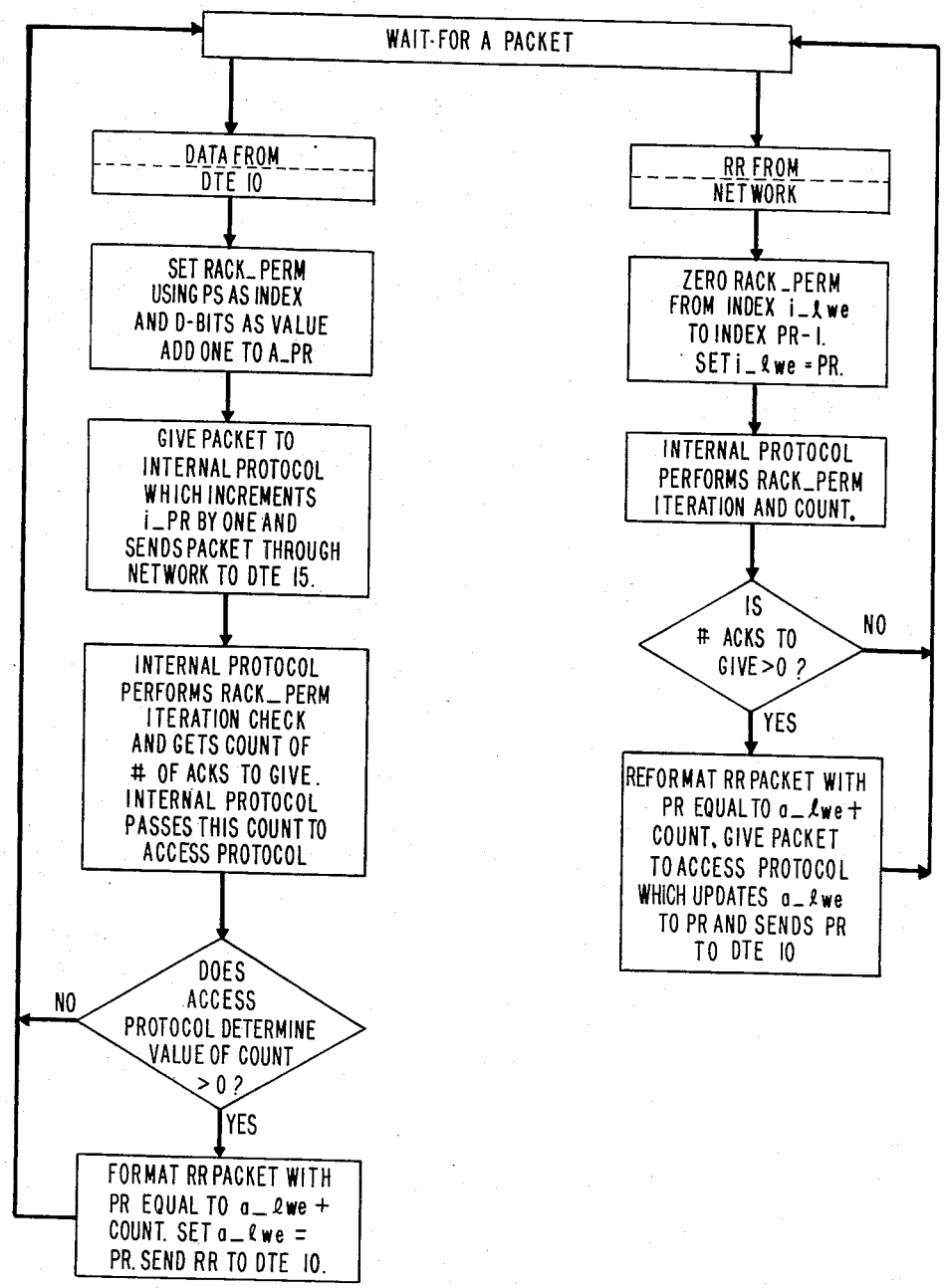
FIG. 3 shows an illustrative flow chart for the steps of processing data packets and controlling the two-sided rack_perm memory table with the two decoupled sets of indices for one logical channel.

(6) The flow chart of FIG. 3 is only for data packets sent from terminal equipment 10 to equipment 15. Traffic in the other direction would follow similar procedures.

(7) Network congestion control mechanisms are not discussed. However, if an ACK would be allowed, but congestion is high, the internal protocol may decide to delay the ACK. The illustrative algorithm assumes no congestion.

The following is a list of the parameters used in the illustrative algorithm:

(1) a_pr

This parameter is the access protocol's receive sequence number [equals the data terminal equipment 10 send sequence number (PS in the data packet)]. It is the value of the next expected send sequence number from terminal equipment 10 and is used to determine if a packet is received out of order.

(2) i_pr

This is the internal protocol receive sequence number.

(3) a_lwe

This parameter is the access protocol's lower window edge. A window is defined as the ordered set of x consecutive packets authorized to cross the interface. The lower window edge is the lowest sequence number in that set.

(4) i_lwe

This is the internal protocol's lower window edge.

(5) rack_perm

This array keeps track of the D-bit acknowledgment permissions for data packets received at this interface. Its entries determine if the data packet with a specific sequence number may be acknowledged in respect to the D-bit processing. There is one element per sequence number modulus which illustratively is modulus 8. Rack_perm illustratively can be an eight byte (or word or bit) array. It is indexed by sequence number. Its allowed values are: 0=permission to ACK; 1=no permission to ACK. These values are tied to the value of the D-bit as it enters the packet switch network in a data packet. When such a packet enters the network, the corresponding rack_perm entry is set to the value of the D-bit. Thus, that bit need not be tested before the need to send out the acknowledgment.

(6) PR

This is a receive sequence number in an ACKing packet.

(7) PS

This is a send sequence number in a data packet.

Turning now to the flow chart of FIG. 3, the administrative control steps involved in the access protocol receiving packets with D-bits from the data terminal 10 of FIG. 1 is explained. Each such packet is formatted to include a PS (Packet Send sequence number). Upon receipt of a packet, the access protocol uses the PS as an index and the D-bit as a value to set the rack_perm memory for that packet. The access protocol then adds one to the a_pr parameter (Access Protocol receive sequence number) so as to equal the data terminal 10 send sequence number of the next packet to be received. Next, the received packet is transferred to the internal protocol which increments i_pr (Internal Protocol receive sequence number) and sends that packet through the network of packet switches 12 and 13 to the called data terminal 15. The internal protocol thereafter proceeds to check the rack_perm to terminal 10. The procedure is an iteration of a computation the count results of which are transferred to the access protocol for determining either to deny permission (count not>0) to locally ACK (requires end-to-end ACK) because of the rack_perm D-bit specified by the received packet, or allow the local ACK (count>0). In the latter case, the access protocol controls a formatting of an RR (Receiver Ready) packet with a PR (Packet Receive sequence number) and a sending of that packet over line 11 to terminal 10.

The administrative control steps provide for the processing of RR (Receiver Ready) packets received by the internal protocol via the network of packet switches from the destination terminal end. One such RR packet is illustratively sent in response to each data packet transmitted from the originating data terminal. Each such RR packet contains a PR parameter to identify that packet's receive sequence number and its relationship to the data packet earlier sent from the originating terminal. Upon receipt of the RR packet, the internal protocol controls the zeroing of the rack_perm from the internal protocol lower window edge, i_lwe, parameter index to the (PR−1) index and then the setting of the i_lwe=PR. This step allows for the PR to ACK more than one packet. The internal protocol is next effective to check the rack_perm to determine the number of ACKs permitted, if any. The determination is made by an iteration and count as earlier described. If none are permitted, the packet is illustratively discarded. If an ACK is permitted, a reformatted RR packet is supplied to the access protocol for transmission over line 11 to data terminal 10.

Figure 4:
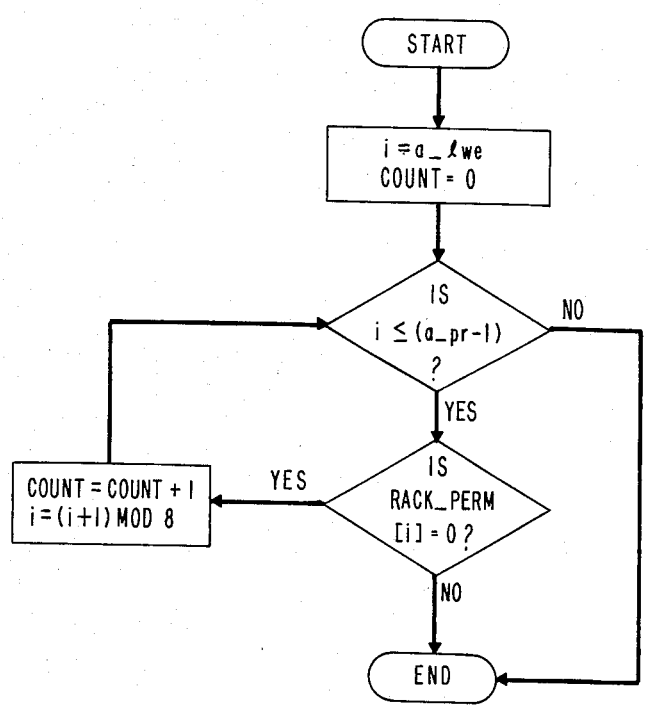
FIG. 4 is an exemplary iteration and counting flow chart used for rack_perm checking.
Figure 5:
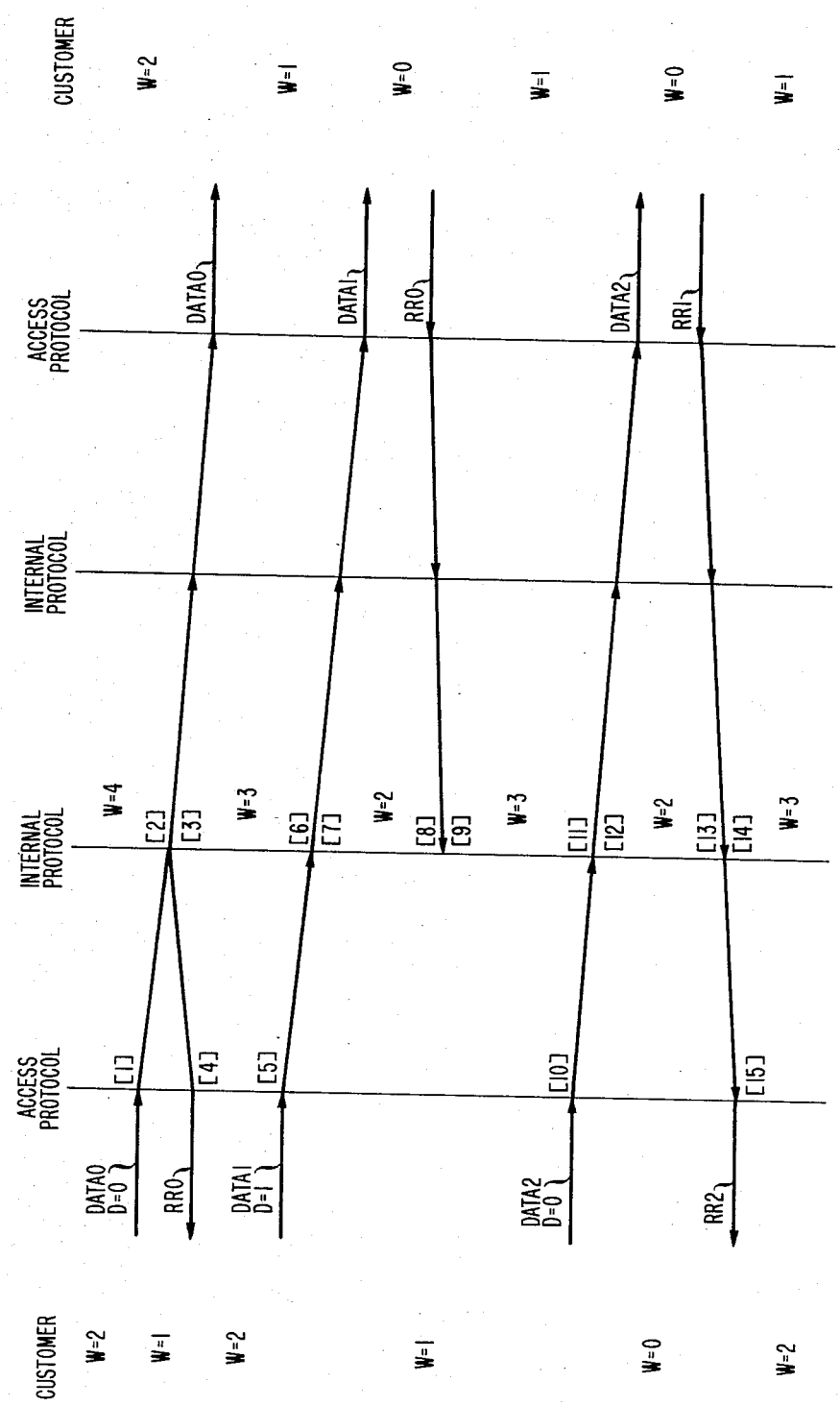
FIG. 5 illustrates a D-bit example of an access protocol window equal to 2 and an internal to protocol window equal to 4 functioning on three data packets.

An explanation of an illustrative specific algorithm is presented with respect to FIGS. 3, 4 and 5. In doing so, it is assumed that a virtual call has been established from terminal equipment 10 through packet switches 12 and 13 to terminal equipment 15 of FIG. 1 on specific logical channels at each end. The specific channel numbers are not discussed in the explanation as they are irrelevant to the illustration. Further assume, for example, that the access protocol window size is 2 (two data packets are authorized to be transmitted across link 11 from terminal equipment 10 to packet switch 12) and the internal protocol window size is 4 (four data packets are authorized to be transmitted from packet switch 12 to packet switch 13).

The example starts with a first data packet sent from terminal equipment 10 to equipment 15; thus, all the sequence number information starts at zero. In the example, three data packets are to be sent from terminal equipment 10 to equipment 15.

FIG. 5 is a diagram of the example. The window opening W, that is, the number of data packets allowed to cross the access and internal protocol interface at any specific time is noted in FIG. 5.

Accordingly, at the start of the algorithm, the parameter are:

$a\_lwe=0$; $a\_pr=0$; $i\_lwe=0$; $i\_pr=0$; rack_perm=0,0,0,0,0,0,0,0.

Illustratively, there are fifteen steps in the example algorithm and they are bracketed numbers [1] through [15] in FIG. 5. All arithmetic operations except the counting in the example are modulo 8. The parameters after an individual processing step has been completed with changed values underlined are listed with each step as follows:

[1] Upon receiving, data packet 0 from terminal equipment 10 with the PS=0 and the D-bit=0 (local ACK), set the rack_perm using PS as an index and the D-bit as the value and add one to a_pr (to reflect the value of the next expected sequence number from the terminal equipment 10) as shown in flow chart of FIG. 3. Resultingly, $a\_lwe=0$; $\underline{a\_pr=1}$; $i\_lwe=0$; $i\_pr=0$; rack_perm=0,0,0,0,0,0,0,0.

[2] Data packet 0 sent to the internal protocol which increments i_pr by one and sends that packet through the packet switches 12 and 13 to terminal equipment 15. Thus, $a\_lwe=0$; $a\_pr=1$; $i\_lwe=0$; $\underline{i\_pr=1}$; rack_perm=0,0,0,0,0,0,0,0.

[3] Check by internal protocol of rack_perm for acknowledgment permission and to determine the number of ACKs to be returned to equipment 10 as shown in FIG. 3.

To check rack_perm for ACK permission, an iteration is performed as disclosed in the flow chart of FIG. 4. The iteration is a repetition, or repertory looping, of a block of code to effect examinations of the stored information in the rack_perm for ascertaining whether permission to ACK is denied or allowed. The examination starts illustratively at an index point i defined by a_lwe and sequences successfully through the rack_perm to an end point defined by (a_pr−1) modulo the sequence modulus or until a permission denied value ("1" in the exemplary embodiment) is detected. While conducting the examination, a count is maintained within the body of the iteration for the number of the ACK permissions detected.

Turning now more specifically to the details of the illustrative iteration in the flow chart of FIG. 4, the checking operations are described. It starts at an index to the rack_perm equal to a_lwe and a count equal to zero, and then proceeds into the body of the iteration to determine whether the index is less than a_pr illustratively (a_pr−1). The determination is controlled by the modular arithmetic used in the sequence numbering scheme.

If the determination is yes, the rack_perm is checked at the indexed location to ascertain if an illustrative zero is stored at the location. If the answer is yes, the count is incremented by one to indicate the detection of an ACK permission allowed, and the index is incremented by one, modulo the sequence numbering modulus. Next, the body of the iteration is repeated.

On the other hand, if the index is greater than or equal to a_pr or the value of the indexed location is illustratively 1, the iteration is complete. The final count is the number of packets that may be ACKed.

According to the example, loop parameters go from 0 to (1−1), count=1. Thus, for the present example, the check is greater than 0 and an RR (Receiver Ready) can be sent to terminal equipment 10 as depicted in FIG. 3. The count is transferred to the access protocol.

$a\_lwe=0$; $a\_pr=1$; $i\_lwe=0$; $i\_pr=1$; rack_perm=0,0,0,0,0,0,0,0.

[4] As shown in FIG. 3, the access protocol examines the count and formats an RR packet with PR (receive sequence number) equal to (a_lwe+count) which is 1 and set a_lwe=PR. Sends the RR from packet switch 12 to terminal equipment 10.

a_lwe=1; a_pr=1; i_lwe=0; i_pr=1; rack_perm=0,0,0,0,0,0,0,0.

[5] Access protocol receives data packet 1 from terminal equipment 10. The PS (Send Sequence Number)=1 and the D-bit=1 (end-to-end acknowledgment). Set rack_perm using the PS as an index and the D-bit as the value and add one to a_pr (to reflect the values of the next expected sequence number from equipment 10).

a_lwe=1; a_pr=2; i_lwe=0; i_pr=1; rack_perm=0,1,0,0,0,0,0,0 .

[6] The access protocol sends data packet 1 to the internal protocol, which increments i_pr by one and sends packet 1 through packet switches 12 and 13 to terminal equipment 15.

a_lwe=1; a_pr=2; i_lwe=0; i_pr=2 rack_perm=0,1,0,0,0,0,0,0.

[7] Internal protocol checks rack_perm for acknowledgment permission to return an ACK to equipment 10. Repeat the foregoing of step [3] but since D-bit=1 and indicates end-to-end acknowledgment, none is to be returned. Loop parameters go from 1 to (2−1) count=0. This count is transferred to the access protocol which determines therefrom that an RR (Receiver Ready) packet cannot be returned to equipment 10 and the transport switching system proceeds with further processing activity a_lwe=1; a_pr=2; i_lwe=0; i_pr=2 rack_perm=0,1,0,0,0,0,0,0.

[8] RR (Receiver Ready) packet for data packet 0 is received by the internal protocol from terminal equipment 15 via the packet switch network. The PR=1 (Receive sequence number) in the RR packet. As set forth in the flow chart of FIG. 3, the next actions are to zero the rack_perm from the index i_lwe to index (PR−1) and set i_lwe=PR.

a_lwe=1; a_pr=2; i_lwe=1; i_pr=2; rack_perm=0,1,0,0,0,0,0,0.

[9] Internal protocol checks rack_perm for acknowledgment permission to return an ACK to equipment 10. Repeat step [3]. Loop parameters go from 1 to (2−1), count=0. Since the count is not greater than 0 an RR packet cannot be sent to equipment 10 and the transport packet switching system proceeds with further processing activity.

a_lwe=1; a_pr=2; i_lwe=1; i_pr=2; rack_perm=0,1,0,0,0,0,0,0.

[10] Access protocol receives data packet 2 from terminal equipment 10. The PS (Send sequence number)=2 and the D-bit=0 (local ACK). Repeat of the foregoing step [1].

a_lwe=1; a_pr=3; i_lwe=1; i_pr=2 rack_perm=0,1,0,0,0,0,0,0.

[11] Access protocol sends data packet 2 to internal protocol, which increments i_pr by one and sends data packet 2 through packet switches 12 and 13 to terminal equipment 15.

a_lwe=1; a_pr=3; i_lwe=1; i_pr=3; rack_perm=0,1,0,0,0,0,0,0.

[12] Internal protocol checks rack_perm for acknowledgment permission to return an ACK to equipment 10. Repeat of step [3] FIG. 2, but since the prior data packet can not as yet be ACKed (end-to-end), permission is withheld. Loop parameters go from 1 to (3−1), count=0 and no permission is granted. Thus, an RR cannot be sent as yet to terminal equipment 10. The count is returned to the access protocol and the transport switching system proceeds with further processing activity.

a_lwe=1; a_pr=3; i_lwe=1; i_pr=3; rack_perm=0,1,0,0,0,0,0,0.

[13] Internal protocol receives RR (Receiver Ready) packet received for data packet 1 from the network. PR=2 in the RR packet. As shown in flow chart of FIG. 2, the next actions are to zero reset the rack_perm for packet 1 from the index i_lwe to (PR−1) and set i_lwe=PR.

a_lwe=1; a_pr=3; i_lwe=2; i_pr=3; rack_perm=0,0,0,0,0,0,0,0.

[14] Internal protocol checks rack_perm for acknowledgment permission to return an RR packet to terminal equipment 10. Repeat step [3]. Loop parameters go from 1 to (3−1), count=2. Thus, an RR can be sent to terminal equipment 10 with two acknowledgments allowed.

a_lwe=1; a_pr=3; i_lwe=2; i_pr=3 rack_perm=0,0,0,0,0,0,0,0.

[15] The internal protocol formats an RR packet with PR equal to (a_lwe+count) (which is 3) and sends the RR packet with two acknowledgments specified therein to the access protocol which updates a_lwe to PR and communicates that packet to terminal equipment 10.

a_lwe=3; a_pr=3; i_lwe=2; i_pr=3; rack_perm=0,0,0,0,0,0,0,0.

It is to be understood that the above-described arrangements are merely illustrative of the application of principles of the invention and that numerous other arrangements may be devised by those skilled in the art without departing from the spirit and scope of the invention. For example, the illustrative embodiment describes a method in which an access protocol sets a memory table rack_perm to store D-bit values of data packets received from a data terminal and increments its received sequence number before handing off the data packet to the internal protocol. According to another preferred method the access protocol is arranged only to increment its receive access sequence number upon receipt of a data packet and then to transfer that packet to the interval protocol which advantageously sets the rack_perm using the send sequence number of the packet as an index into rack_perm. An advantage of this arrangement is that only one protocol need know about rack_perm and how to manipulate it. The internal protocol utilizes the access protocol control parameters including its lower window edge and receive sequence number for checking rack_perm to determine the number of allowed ACKS.

What is claimed is:

1. A method of administering the communication of acknowledgment packets under control of an access protocol for data packets received by said protocol from an originating link, comprising receiving from said originating link a data packet having an information bit specifying a local or end-to-end acknowledgment request and a packet send sequence number, setting a memory table using said packet send sequence number as an index and said information bit as a value, transferring the received packet to an internal protocol for communication through a packet switch network to a destination link, and checking the set memory table to determine permission to send an acknowledgment packet to said originating link.

2. The invention of claim 1 further comprising formatting an acknowledgment packet when said checking indicates that a local acknowledgment is permitted for said received data packet, and communicating said acknowledgment packet to said originating link.

3. The invention of claim 1 further comprising incrementing an access protocol receive sequence number incident to said setting of said memory table, incrementing an internal protocol receive sequence number following the transfer of said received data packet to said internal protocol, and thereafter performing said checking of the set memory table to determine permission to send an acknowledgment packet to said originating link.

4. The invention of claim 3 further comprising formatting an acknowledgment packet when said checking indicates that a local acknowledgment is permitted for said received data packet, and communicating said acknowledgment packet to said originating link.

5. The invention of claim 1 further comprising receiving by said internal protocol of a control packet from said packet switch network, executing said checking of said set memory table by said internal protocol and in response to a received control packet to determine permission to send an end-to-end acknowledgment packet to said originating link.

6. The invention of claim 5 further comprising formatting an acknowledgment packet by said internal protocol when the executed checking indicates that an acknowledgment is permitted, and communicating said acknowledgment packet to said originating link.

7. A method of administering the communication of acknowledgment packets comprising setting a memory table using a local or end-to-end acknowledgment value of a received data packet and a packet send sequence number of said data packet as an index to a storage location in said memory table, transferring said received data packet to an internal protocol for communication through a switching system, checking the set memory table by said internal protocol to determine permission to send an acknowledgment packet to an originating link and, controlling the set memory table to change the setting thereof in response to a receipt by said internal protocol of an acknowledgment control packet.

8. A method of administering the communication of acknowledgment packets to an information terminal under control of an access protocol and an internal protocol of a communication switching system, said system comprising a memory for storing acknowledgment information values and a plurality of control parameters including a receive sequence number for said access protocol and a receive sequence number for said internal protocol, said method comprising setting said memory using a packet send sequence number of an information packet received by said access protocol from said information terminal to index a storage location of said memory and a local or end-to-end acknowledgment value of said received packet for storage of said value at the indexed location, incrementing said access protocol receive sequence number, transferring said received packet from said access protocol to said internal protocol for communication through said switching system, incrementing said receive sequence number of said internal protocol, and checking the set memory using selected ones of said plurality of control parameters to determining permission to send an acknowledgment packet to said information terminal.

9. The invention of claim 8 wherein said selected ones of said control parameters include an access protocol lower window edge number defining a lowest sequence number in an ordered set of consecutive information packets authorized to be communicated from said link to said access protocol and said checking is executed by said internal protocol and of said set memory using said access protocol received sequence number and said lower window edge number.

10. The invention of claim 9 wherein said acknowledgment values comprise a first value for a local acknowledgment and a second value for an end-to-end acknowledgment, and further comprising formatting an acknowledgment packet in response to said checking and a presence of said first value in said indexed location, and sending the formatted acknowledgment packet to said information terminal.

11. The invention of claim 9 wherein said checking comprises examining said set memory to establish a count of the number of acknowledgment packets permitted to be sent to said information terminal.

12. The invention of claim 11 further comprising formatting an acknowledgment packet with a receive sequence number equal to said access protocol lower window edge index number plus the count established in response to said checking determining that a sending of an acknowledgment packet is permitted.

13. The invention of claim 12 further comprising setting said access protocol lower window edge index number equal to said receive sequence number under control of said access protocol, and sending the formatted acknowledgment packet to said information terminal.

14. The invention of claim 9 wherein said control parameters further include an internal lower window edge index defining a lowest sequence number in an ordered set of a plurality of consecutive information packets authorized to be communicated from said internal protocol to said switch network, and further comprising controlling a resetting of the stored information values in said set memory under control of said internal protocol and in response to said internal protocol lower window edge index number and a receive sequence number in a control packet received by said internal protocol, setting said internal protocol lower window edge index equal to said receive sequence number in said received control packet, and checking under control of said internal protocol the reset memory for determining permission to send an acknowledgment packet to said information terminal.

15. The invention of claim 14 wherein said controlling of the resetting of said information values stored in said set memory comprises zeroing said set memory from said internal protocol lower window edge index number to said receive sequence number in said control packet minus one and prior to said setting of said internal protocol lower window edge index equal to said receive sequence number in said control packet.

16. The invention of claim 14 further comprising formatting under control of said internal protocol an acknowledgment packet with a receive sequence number including said access protocol lower window edge index number, transferring the formatted last-mentioned acknowledgment packet to said access protocol for communication to said information terminal.

17. The invention of claim 16 further comprising updating under control of said access protocol said access protocol lower window edge index number to said receive sequence number of said control packet prior to a communication of said formatted last-mentioned acknowledgment packet to said information terminal.

18. The invention of claim 14 wherein said checking under control of said internal protocol comprises examining the stored values in said memory to establish a count of the number of acknowledgment packets permitted to be sent to said information terminal.

19. The invention of claim 18 further comprising formatting an acknowledgment packet with a receive sequence number equal to said access protocol lowest window edge index number plus the established count.

20. The invention of claim 19 wherein said formatting of said last-mentioned acknowledgment packet is under control of said internal protocol, and further comprising transferring the formatted last-mentioned acknowledgment packet to said internal protocol for communication to said information terminal.

21. The invention of claim 20 further comprising updating under control of said access protocol said access protocol lower window edge index number to said receive sequence number of said control packet prior to a communication of said last-mentioned acknowledgment packet to said information terminal.

22. A method of administering the communication of acknowledgment packets to a communication link under control of an access protocol and an internal protocol of a communication system, said system comprising a receive acknowledgment permission memory having storage locations for storing a plurality of acknowledgment values for information packets received from said link and an internal protocol lower window edge number defining a lowest sequence number in an ordered set of consecutive information packets authorized to be communicated from said internal protocol to another communication link, said method comprising setting said memory using a packet send sequence number of an information packet received from said first-mentioned link to index one of said storage locations and a local or end-to-end acknowledgment value of said received packet for storage of said value at the indexed one of said locations, transferring said received packet to said internal protocol, controlling an altering of the values stored in said storage locations in the set memory under control of said internal protocol and said internal protocol lower window edge number and in response to a receive sequence number in a control packet received by said internal protocol from said other link, setting said internal protocol lower window edge number equal to said receive sequence number in said received control packet, and checking under control of said internal protocol said values stored in said memory for determining permission to send an acknowledgment packet to said first-mentioned link.

23. The invention of claim 22 further comprising checking under control of said internal protocol said values stored in said set memory for determining permission locally to send an acknowledgment packet to said information terminal following said transferring of said received information packet to said internal protocol and prior to said controlling of an altering of said values stored in said storage locations in said set memory.

24. A method of administering the communication of local and end-to-end acknowledgment packets utilizing a single receive acknowledgment permission memory in a communication system, said memory having storage locations for storing a plurality of acknowledgment values for information packets received by said access protocol from an access link, said method comprising setting said memory using a packet sequence number of an information packet received by said access protocol from said information link to index one of said locations and a local or end-to-end acknowledgment value of said received packet for storage of said value at the indexed one of said locations, controlling a resetting of stored values in the set memory under control of said internal protocol and in response to an internal protocol lower window edge index number and a receive sequence number in a control packet received by said internal protocol, said index number defining a lowest sequence number in an ordered set of consecutive information packets authorized to be communicated from said internal protocol, checking the set memory under control of said access protocol determining permission locally to send an acknowledgment packet to said information terminal, and checking the reset memory under control of said internal protocol for determining permission to send an end-to-end acknowledgment signal to said information terminal.

25. A method of administering a communication of acknowledgment packets in a packet communication system having a memory for storing acknowledgment information supplied in data packets received over a communication link under control of an X.25 access protocol, said method comprising receiving each of said data packets by an internal protocol for communication to a packet switch network, checking the stored information in said memory and under control of said internal protocol and a lower window edge index value of said access protocol to determine permission to send a local acknowledgment packet to said communication link.

26. The invention of claim 25 further comprising altering the information stored in said memory in response to a receipt of a control packet by said internal protocol and under control of a lower window edge index value of said internal protocol and checking the altered information stored in said memory and under control of said lower window edge index value of said access protocol and a receive sequence number of said access protocol to determine permission to send an end-to-end acknowledgment packet to said communication link.

27. The invention of claim 26 wherein said altering comprises zeroing said memory from a lower window edge index value to a receive sequence number of control packet minus one and said checking comprises examining the zero information stored in said memory at indices from the lower window edge index value of said access protocol to the receive sequence number of said access protocol minus one and counting the number of zero information values stored in said memory to specify the number of acknowledgment packets permitted to be sent to said communication link.

28. A method of administering the communication of acknowledgment packets comprising receiving at an access protocol from an originating link a data packet having an information bit specifying a local or end-to-end acknowledgment request and a packet send sequence number, incrementing by one a receive sequence number of said access protocol, transferring the received packet from said access protocol to an internal protocol for communication through a packet switch network to a destination, setting a memory using said packet send sequence number as an index to a storage location thereof and said information bit as a value, incrementing by one a receive sequence number of said internal protocol, checking the set memory under control of said internal protocol and a lower window edge index number of said internal protocol to determine permission to send a local acknowledgment packet to said originating link, and including counting the number of acknowledgments permitted, formatting a permitted acknowledgment packet with a receive sequence number equal to a lower window edge index number of said access protocol plus the counted number of acknowledgment permissions, setting said lower window edge index number equal to said receive sequence number, sending said formatted acknowledgment packet to said originating link, receiving by said internal protocol of a control packet from said packet switch network, zeroing said set memory from an index of said lower window edge number of said internal protocol to an index of said receive sequence number of said control packet minus one, setting said lower window edge index number of said internal protocol equal to said receive sequence number of said control packet, checking information values in said memory and under control of said internal protocol to determine permission to send an end-to-end acknowledgement packet to said originating link and including counting the number of acknowledgments permitted, formatting under control of said internal protocol an end-to-end acknowledgment packet with a receive sequence number equal to said lower window edge index number plus the counted number of acknowledgment permissions, transferring the last-mentioned packet to said access protocol, updating the lower window edge index number equal to the receive sequence number of said control packet, and sending said last-mentioned packet to said originating link.

29. A method of administering a communication of acknowledgment packets comprising setting acknowledgment information in a memory incident to a receipt of a data packet from a communication link and under control of indices of a first protocol and checking the set memory under control of a second protocol and said indices to determine permission to send an acknowledgment packet to said communication link, and said checking being executed in response to a receipt of a control packet by said second protocol and comprises altering said information in said set memory in response to an index of said second protocol and examining the altered memory under control of said second protocol and said indices of said first protocol to determine permission to send an acknowledgment packet to said communication link.

* * * * *